United States Patent
Wang

(10) Patent No.: US 10,693,967 B2
(45) Date of Patent: Jun. 23, 2020

(54) DATA CONNECTION ESTABLISHMENT METHOD, SERVER, AND MOBILE TERMINAL

(71) Applicant: Huawei Technologies Co., Ltd., Shenzhen (CN)

(72) Inventor: Yongliang Wang, Nanjiang (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 15/756,916

(22) PCT Filed: Aug. 17, 2016

(86) PCT No.: PCT/CN2016/095681
§ 371 (c)(1),
(2) Date: Mar. 1, 2018

(87) PCT Pub. No.: WO2017/036305
PCT Pub. Date: Mar. 9, 2017

(65) Prior Publication Data
US 2018/0255145 A1    Sep. 6, 2018

(30) Foreign Application Priority Data
Sep. 2, 2015 (CN) .......................... 2015 1 0559594

(51) Int. Cl.
*H04L 29/08* (2006.01)
*H04L 12/28* (2006.01)
(Continued)

(52) U.S. Cl.
CPC ............ *H04L 67/141* (2013.01); *H04L 12/28* (2013.01); *H04L 67/42* (2013.01); *H04W 76/10* (2018.02);
(Continued)

(58) Field of Classification Search
None
See application file for complete search history.

(56) References Cited

U.S. PATENT DOCUMENTS 7,797,429 B2 * 9/2010 Liang ................ H04L 29/12377
370/422
8,065,418 B1 * 11/2011 Abuan .................. H04L 29/125
709/227

(Continued)

FOREIGN PATENT DOCUMENTS

CN        101141420 A    3/2008
CN        101282232 A    10/2008
(Continued)

*Primary Examiner* — Backhean Tiv
(74) *Attorney, Agent, or Firm* — Slater Matsil, LLP

(57) ABSTRACT

Embodiments of the present invention relate to a data connection establishment method, a server, and a mobile terminal. After receiving a connection request sent by a first client, a server determines whether a connection to a second client belonging to a same local area network with the first client has already been established; if yes, the server returns, to the first client, a reply message used to instruct the first client to establish a connection to the second client; and disconnects from the first client after the connection between the first client and the second client is established.

18 Claims, 7 Drawing Sheets

(51) Int. Cl.
*H04W 76/10* (2018.01)
*H04L 29/06* (2006.01)
*H04L 29/12* (2006.01)

(52) U.S. Cl.
CPC ...... *H04L 61/2007* (2013.01); *H04L 61/6063* (2013.01)

(56) References Cited

U.S. PATENT DOCUMENTS

| | | | | |
|---|---|---|---|---|
| 9,072,078 | B2* | 6/2015 | Hsieh | H04L 61/1535 |
| 10,454,689 | B1* | 10/2019 | Sharifi Mehr | H04L 9/3215 |
| 2002/0129161 | A1* | 9/2002 | Lloyd | H04L 41/142 |
| | | | | 709/238 |
| 2002/0165973 | A1* | 11/2002 | Ben-Yehezkel | H04L 1/1664 |
| | | | | 709/230 |
| 2003/0028671 | A1 | 2/2003 | Mehta et al. | |
| 2003/0195984 | A1* | 10/2003 | Zisapel | G06F 9/505 |
| | | | | 709/238 |
| 2003/0212795 | A1* | 11/2003 | Harris | H04L 29/12009 |
| | | | | 709/227 |
| 2003/0225924 | A1* | 12/2003 | Jung | H04L 29/12066 |
| | | | | 719/313 |
| 2004/0114592 | A1* | 6/2004 | Kang | H04Q 11/0067 |
| | | | | 370/389 |
| 2004/0131077 | A1* | 7/2004 | Takemura | H04L 29/12009 |
| | | | | 370/457 |
| 2005/0220076 | A1* | 10/2005 | Kokado | H04L 12/2854 |
| | | | | 370/351 |
| 2007/0100974 | A1* | 5/2007 | Standford-Clark | H04L 67/322 |
| | | | | 709/223 |
| 2007/0111797 | A1* | 5/2007 | Sasaki | A63F 13/335 |
| | | | | 463/42 |
| 2007/0171918 | A1* | 7/2007 | Ota | H04L 12/2856 |
| | | | | 370/395.53 |
| 2008/0133538 | A1* | 6/2008 | Chavez | H04L 67/104 |
| 2009/0037583 | A1* | 2/2009 | Alessandri | H04L 29/12367 |
| | | | | 709/225 |
| 2009/0077260 | A1* | 3/2009 | Bearman | G06F 15/16 |
| | | | | 709/238 |
| 2009/0126019 | A1* | 5/2009 | Memon | G06F 21/552 |
| | | | | 726/23 |
| 2009/0296646 | A1 | 12/2009 | Dunk | |
| 2011/0075551 | A1* | 3/2011 | Lee | H04L 29/12915 |
| | | | | 370/217 |
| 2011/0082941 | A1* | 4/2011 | Kim | H04L 12/2859 |
| | | | | 709/227 |
| 2011/0145397 | A1* | 6/2011 | Burns | H04L 29/1249 |
| | | | | 709/224 |
| 2011/0307538 | A1* | 12/2011 | Rimac | H04L 29/08846 |
| | | | | 709/202 |
| 2012/0196601 | A1* | 8/2012 | Lundqvist | H04L 29/12066 |
| | | | | 455/435.2 |
| 2013/0166654 | A1* | 6/2013 | Hjelm | H04L 67/1046 |
| | | | | 709/204 |
| 2014/0003599 | A1* | 1/2014 | Kim | H04M 3/5191 |
| | | | | 379/265.09 |
| 2014/0078979 | A1* | 3/2014 | Melia | H04L 29/12066 |
| | | | | 370/329 |
| 2014/0092425 | A1* | 4/2014 | Park | G06F 3/1292 |
| | | | | 358/1.15 |
| 2014/0226664 | A1* | 8/2014 | Chen | H04L 61/2589 |
| | | | | 370/392 |
| 2014/0304419 | A1* | 10/2014 | Yoon | H04L 67/104 |
| | | | | 709/228 |
| 2014/0348061 | A1* | 11/2014 | Salkintzis | H04W 48/08 |
| | | | | 370/328 |
| 2014/0379932 | A1* | 12/2014 | Bertin | H04L 65/1069 |
| | | | | 709/227 |
| 2015/0242436 | A1* | 8/2015 | Bodin | G06F 16/1824 |
| | | | | 707/827 |
| 2015/0249666 | A1* | 9/2015 | Kato | H04L 63/1458 |
| | | | | 726/7 |
| 2016/0119348 | A1* | 4/2016 | Kus | H04L 63/10 |
| | | | | 726/1 |
| 2016/0234307 | A1* | 8/2016 | Yan | H04L 12/6418 |
| 2018/0048621 | A1* | 2/2018 | Yiu | H04L 67/104 |
| 2018/0255145 | A1* | 9/2018 | Wang | H04L 67/42 |

FOREIGN PATENT DOCUMENTS

| | | |
|---|---|---|
| CN | 101316161 A | 12/2008 |
| CN | 102291808 A | 12/2011 |
| CN | 102480501 A | 5/2012 |
| CN | 102761864 A | 10/2012 |
| CN | 103812947 A | 5/2014 |
| CN | 104009938 A | 8/2014 |
| EP | 1400093 A2 | 3/2004 |
| EP | 1421810 A2 | 5/2004 |
| EP | 2608489 A1 | 6/2013 |
| EP | 2887214 A1 | 6/2015 |
| WO | 2009086837 A2 | 7/2009 |
| WO | 2014085056 A1 | 6/2014 |
| WO | 2015013194 A1 | 1/2015 |

* cited by examiner

DATA CONNECTION ESTABLISHMENT METHOD, SERVER, AND MOBILE TERMINAL

CROSS-REFERENCE TO RELATED APPLICATIONS

This application is a US National Stage of International Application No. PCT/CN2016/095681, filed on Aug. 17, 2016, which claims priority to Chinese Patent Application No. 201510559594.4, filed on Sep. 2, 2015, which applications are hereby incorporated herein by reference.

TECHNICAL FIELD

The present invention relates to the field of mobile communications, and in particular, to a data connection establishment method, a server, and a mobile terminal.

BACKGROUND

In a wide area network, some network elements may track a connection between devices. If there is no message on the connection over threshold duration, the connection may be cut off. However, a message usually needs to be sent between some devices in time (that is, the devices need to maintain a long connection), and sending of the message, for example, a message sent by a server of a push system to a client of the push system, may exceed the threshold duration. In the foregoing disconnection manner, the server may fail to deliver a message to the client in time, affecting performance of the push system.

In the prior art, to maintain a long connection, devices (for example, a server and a client) usually need to send a heartbeat message to one another. The heartbeat message is a data packet periodically sent between the two devices. However, no useful message is exchanged between the server and the client in most periods of time, resulting in a waste of network traffic resources, resources of connections, and server resources.

SUMMARY

Embodiments of the present invention provide a data connection establishment method, a server, and a mobile terminal, so as to effectively reduce a quantity of long connections between devices, and save network resources.

According to a first aspect, a data connection establishment method is provided. The method includes: sending, by a first client, a first connection request to a server, where the first connection request includes a first address of the first client. The method also includes searching, by the server, a preset storage unit for a second client according to the first address of the first client, where the preset storage unit is configured to store all clients having established a connection to the server and first addresses and second addresses of all the clients, and the second client is a client belonging to a same local area network with the first client. The method also includes, if the server finds the second client, reading, by the server, a second address of the second client, and returning a first reply message to the first client, where the first reply message includes the second address of the second client. The method also includes establishing, by the first client, a connection to the second client according to the second address of the second client.

With reference to the first aspect, in a first implementation of the first aspect, the first connection request further includes a second address of the first client, and the method further includes: if the server does not find the second client, storing, by the server, the second address of the first client in the preset storage unit, and returning a second reply message to the first client; and establishing, by the first client, a connection to the server according to the received second reply message.

With reference to the first aspect or the first implementation of the first aspect, in a second implementation of the first aspect, after the establishing a connection to the first client, the method further includes: transmitting, by the server, data to the first client by using the second client.

According to a second aspect, a data connection establishment method is provided. The method includes: receiving, by a server, a first connection request sent by a first client, where the first connection request includes a first address of the first client; searching a preset storage unit for a second client according to the first address of the first client, where the preset storage unit is configured to store all clients having established a connection to the server and first addresses and second addresses of all the clients, and the second client is a client belonging to a same local area network with the first client. The method also includes, if the second client is found, reading a second address of the second client, and returning a first reply message to the first client, where the first reply message includes the second address of the second client, where the first reply message is used to instruct the first client to establish a connection to the second client.

With reference to the second aspect, in a first implementation of the second aspect, the first connection request further includes a second address of the first client, and the method further includes: if the second client is not found, storing the second address of the first client in the preset storage unit, and establishing a connection to the first client.

With reference to the second aspect or the first implementation of the second aspect, in a second implementation of the second aspect, the method further includes: transmitting, by the server, data to the first client by using the second client.

With reference to the second aspect or the first implementation of the second aspect or the second implementation of the second aspect, in a third implementation of the second aspect, when the first client is disconnected from the second client, the method further includes: receiving a third connection request sent by the first client; searching the preset storage unit for a third client, where the third client is a client belonging to the same local area network with the first client; if the third client is found, instructing the first client to establish a connection to the third client; and transmitting, by the server, data to the first client by using the third client.

With reference to any one of the second aspect or the foregoing three implementations of the second aspect, in a fourth implementation of the second aspect, when a connection address of the second client changes or the server is disconnected from the second client, the method further includes: receiving a fourth connection request sent by the first client; searching the preset storage unit for a fourth client according to the fourth connection request, where the fourth client is a client belonging to the same local area network with the first client; if the fourth client is found, instructing the first client to establish a connection to the fourth client; and transmitting, by the server, data to the first client by using the fourth client.

According to a third aspect, a data connection establishment method is provided. The method includes: sending, by a first client, a first connection request to a server, where the first connection request includes a first address of the first client. The method also includes receiving a first reply message sent by the server, where the first reply message includes a second address of the second client, and the second client is a client belonging to a same local area network with the first client. The method also includes establishing a connection to the second client according to the first reply message.

With reference to the third aspect, in a first implementation of the third aspect, the method further includes: receiving a second reply message sent by the server, where the second reply message does not include the second address of the second client; and establishing a connection to the server according to the second reply message.

With reference to the third aspect or the first implementation of the third aspect, in a second implementation of the third aspect, the method further includes: transmitting, by the first client, data to the server by using the second client.

With reference to the third aspect or the first implementation of the third aspect or the second implementation of the third aspect, in a third implementation of the third aspect, when the first client is disconnected from the second client, the method further includes: sending a third connection request to the server; receiving a third reply message sent by the server, where the third reply message includes a second address of a third client, and the third client is a client belonging to the same local area network with the first client; establishing a connection to the third client according to the third reply message; and transmitting, by the first client, data to the server by using the third client.

With reference to any one of the third aspect or the foregoing three implementations of the third aspect, in a fourth implementation of the third aspect, when a connection address of the second client changes or the server is disconnected from the second client, the method further includes: sending a fourth connection request to the server; receiving a fourth reply message sent by the server, where the fourth reply message includes a second address of a fourth client, and the fourth client is a client belonging to the same local area network with the first client; establishing a connection to the fourth client according to the fourth reply message; and transmitting, by the first client, data to the server by using the fourth client.

According to a fourth aspect, a server is provided. The server includes: a receiving unit, a searching unit, a sending unit, and a reading unit. The receiving unit is configured to receive a first connection request sent by a first client, where the first connection request includes a first address of the first client. The searching unit is configured to search a preset storage unit for a second client according to the first address of the first client received by the receiving unit, where the preset storage unit is configured to store all clients having established a connection to the server and first addresses and second addresses of all the clients, and the second client is a client belonging to a same local area network with the first client. The reading unit is configured to: if the searching unit finds the second client, read a second address of the second client; and the sending unit is configured to return a first reply message to the first client, where the first reply message includes the second address of the second client, and the first reply message is used to instruct the first client to establish a connection to the second client.

With reference to the fourth aspect, in a first implementation of the fourth aspect, the server further includes: a storage unit, where the storage unit is configured to: if the searching unit does not find the second client, store a second address of the first client in the preset storage unit, and establish a connection to the first client.

With reference to the fourth aspect or the first implementation of the fourth aspect, in a second implementation of the fourth aspect, the server further includes: a first transmission unit, where the first transmission unit is configured to transmit data to the first client by using the second client.

With reference to the fourth aspect or the first implementation of the fourth aspect or the second implementation of the fourth aspect, in a third implementation of the fourth aspect, the server further includes: a first instruction unit and a second transmission unit; the receiving unit is further configured to receive a third connection request sent by the first client; the searching unit is further configured to search the preset storage unit for a third client, where the third client is a client belonging to the same local area network with the first client; the first instruction unit is configured to: if the searching unit finds the third client, instruct the first client to establish a connection to the third client; and the second transmission unit is further configured to transmit data to the first client by using the third client.

With reference to any one of the fourth aspect or the foregoing three implementations of the fourth aspect, in a fourth implementation of the fourth aspect, the server further includes: a second instruction unit and a third transmission unit; the receiving unit is further configured to receive a fourth connection request sent by the first client; the searching unit is further configured to search the preset storage unit for a fourth client according to the fourth connection request received by the receiving unit, where the fourth client is a client belonging to the same local area network with the first client; the second instruction unit is configured to: if the searching unit finds the fourth client, instruct the first client to establish a connection to the fourth client; and the third transmission unit is configured to transmit data to the first client by using the fourth client.

According to a fifth aspect, a mobile terminal is provided. The mobile terminal includes: a sending unit, a receiving unit, and an establishment unit. The sending unit is configured to send a first connection request to a server, where the first connection request includes a first address of the mobile terminal. The receiving unit is configured to receive a first reply message sent by the server, where the first reply message includes a second address of the second client, and the second client is a client belonging to a same local area network with the mobile terminal. The establishment unit is configured to establish a connection to the second client according to the first reply message received by the receiving unit.

With reference to the fifth aspect, in a first implementation of the fifth aspect, the receiving unit is further configured to receive a second reply message sent by the server, where the second reply message does not include the second address of the second client; and the establishment unit is further configured to establish a connection to the server according to the second reply message received by the receiving unit.

With reference to the fifth aspect or the first implementation of the fifth aspect, in a second implementation of the fifth aspect, the mobile terminal further includes: a first transmission unit, where the first transmission unit is configured to transmit data to the server by using the second client.

With reference to the fifth aspect or the first implementation of the fifth aspect or the second implementation of the fifth aspect, in a third implementation of the fifth aspect, the mobile terminal further includes: a second transmission unit. The sending unit is further configured to send a third connection request to the server. The receiving unit is further configured to receive a third reply message sent by the server, where the third reply message includes a second address of a third client, and the third client is a client belonging to the same local area network with the mobile terminal. The establishment unit is further configured to establish a connection to the third client according to the third reply message received by the receiving unit. The second transmission unit is configured to transmit data to the server by using the third client.

With reference to any one of the fifth aspect or the foregoing three implementations of the fifth aspect, in a fourth implementation of the fifth aspect, the mobile terminal further includes a third transmission unit. The sending unit is further configured to send a fourth connection request to the server. The receiving unit is further configured to receive a fourth reply message sent by the server, where the fourth reply message includes a second address of a fourth client, and the fourth client is a client belonging to the same local area network with the mobile terminal. The establishment unit is further configured to establish a connection to the fourth client according to the fourth reply message received by the receiving unit. The third transmission unit is configured to transmit data to the server by using the fourth client.

According to a sixth aspect, a server is provided. The server includes: a receiver, a processor, a memory, a communications interface, and a transmitter. The receiver is configured to receive a first connection request sent by a first client, where the first connection request includes a first address of the first client. The processor is configured to search the memory for a second client according to the first address of the first client received by the receiver, where the memory is configured to store all clients having established a connection to the server and first addresses and second addresses of all the clients, and the second client is a client belonging to a same local area network with the first client. The processor is further configured to: if the second client is found, read a second address of the second client. The transmitter is configured to return a first reply message to the first client, where the first reply message includes the second address of the second client, and the first reply message is used to instruct the first client to establish a connection to the second client.

With reference to the sixth aspect, in a first implementation of the sixth aspect, the memory is configured to: if the processor does not find the second client, store a second address of the first client in the memory, and establish a connection to the first client.

With reference to the sixth aspect or the first implementation of the sixth aspect, in a second implementation of the sixth aspect, the communications interface is configured to transmit data to the first client by using the second client.

With reference to the sixth aspect or the first implementation of the sixth aspect or the second implementation of the sixth aspect, in a third implementation of the sixth aspect, the receiver is further configured to receive a third connection request sent by the first client; the processor is further configured to search the memory for a third client, where the third client is a client belonging to the same local area network with the first client; the processor is further configured to: if the third client is found, instruct the first client to establish a connection to the third client; and the communications interface is further configured to transmit data to the first client by using the third client.

With reference to any one of the sixth aspect or the foregoing three implementations of the sixth aspect, in a fourth implementation of the sixth aspect, the receiver is further configured to receive a fourth connection request sent by the first client; the processor is further configured to search the memory for a fourth client according to the fourth connection request received by the receiver, where the fourth client is a client belonging to the same local area network with the first client; the processor is further configured to: if the fourth client is found, instruct the first client to establish a connection to the fourth client; and the communications interface is further configured to transmit data to the first client by using the fourth client.

According to a seventh aspect, a mobile terminal is provided. The mobile terminal includes: a transmitter, a receiver, a processor, and a communications interface. The transmitter is configured to send a first connection request to a server, where the first connection request includes a first address of the mobile terminal. The receiver is configured to receive a first reply message sent by the server, where the first reply message includes a second address of the second client, and the second client is a client belonging to a same local area network with the mobile terminal. The processor is configured to establish a connection to the second client according to the first reply message received by the receiver.

With reference to the seventh aspect, in a first implementation of the seventh aspect, the receiver is further configured to receive a second reply message sent by the server, where the second reply message does not include the second address of the second client; and the processor is further configured to establish a connection to the server according to the second reply message received by the receiver.

With reference to the seventh aspect or the first implementation of the seventh aspect, in a second implementation of the seventh aspect, the communications interface is configured to transmit data to the server by using the second client.

With reference to the seventh aspect or the first implementation of the seventh aspect or the second implementation of the seventh aspect, in a third implementation of the seventh aspect, the transmitter is further configured to send a third connection request to the server; the receiver is further configured to receive a third reply message sent by the server, where the third reply message includes a second address of a third client, and the third client is a client belonging to the same local area network with the mobile terminal; the processor is further configured to establish a connection to the third client according to the third reply message received by the receiver; and the communications interface is further configured to transmit data to the server by using the third client.

With reference to any one of the seventh aspect or the foregoing three implementations of the seventh aspect, in a fourth implementation of the seventh aspect, the transmitter is further configured to send a fourth connection request to the server; the receiver is further configured to receive a fourth reply message sent by the server, where the fourth reply message includes a second address of a fourth client, and the fourth client is a client belonging to the same local area network with the mobile terminal; the processor is further configured to establish a connection to the fourth client according to the fourth reply message received by the receiver; and the communications interface is further configured to transmit data to the server by using the fourth client.

By means of the data connection establishment method, the server, and the mobile terminal provided in the embodiments of the present invention, after receiving a connection request sent by a first client, a server determines whether a connection to a second client belonging to a same local area network with the first client has already been established; if yes, returns, to the first client, a reply message used to instruct the first client to establish a connection to the second client; and disconnects from the first client after the connection between the first client and the second client is established. Therefore, a quantity of long connections between devices can be effectively reduced, and network resources are saved.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding of the present invention, the following further describes the embodiments of the present invention in detail with reference to the accompanying drawings. The embodiments are not intended to limit the protection scope of the present invention.

Figure 1:
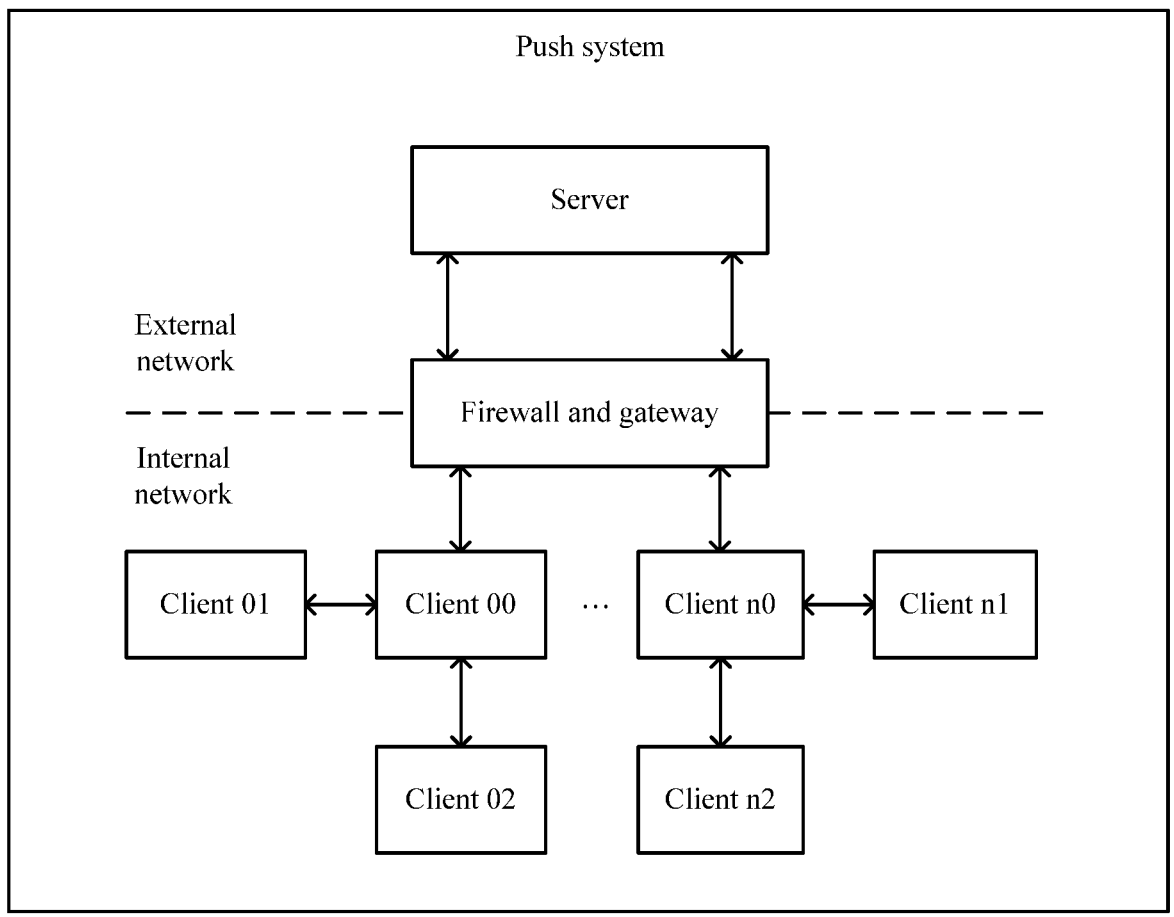
FIG. 1 is a schematic diagram of a push system.

A data connection establishment method provided in the present invention is applied to a push system shown in FIG. 1. In FIG. 1, the push system includes: a server and at least one client (also referred to as a device). The server is in an external network, and the server corresponds to a unique first address (also referred to as an external network address, including an IP address and a listening port) for the client to access. Each client is in a local area network (also referred to as an internal network). It should be noted that clients may directly communicate with each other in the internal network, or may communicate with the server in the external network. When the clients communicate with each other in the internal network, each of the clients may be allocated with a corresponding second address (also referred to as an internal network address, including an IP address and a port). When any client communicates with the server in the external network, the any client may be allocated with a corresponding first address (including an IP address and a port). In addition, a firewall and a network element having a gateway function (also referred to as a gateway device) are provided between the internal network and the external network. The client in the internal network needs to pass through a gateway device to access the server in the external network. The gateway device may map the first address and the second address. IP addresses in first addresses of the clients in a same local area network are the same after the first addresses are mapped by the gateway device, and only ports are different. In this way, the server may determine, according to whether IP addresses in first addresses of clients are the same, whether the clients belong to a same local area network.

In FIG. 1, clients (for example, a client 00, a client 01, and a client 02) in a same local area network may access each other by directly using IP addresses in second addresses. Therefore, if one or more clients in a same local area network have established a long connection to a server, other clients may establish a connection to the one or more clients. In this way, a quantity of long connections in an external network is reduced, and heartbeat messages do not need to be sent for maintaining the redundant long connections. For example, after the client 00 establishes a long connection to the server, the client 01 and the client 02 may establish a connection to the client 00, and do not need to directly establish a long connection to the server. The client 00 sends a heartbeat message to maintain the long connection to the server. Usually, the client 01 or the client 02 does not need to send a heartbeat message to the client 00 in a same internal network to maintain the connection.

Figure 2:
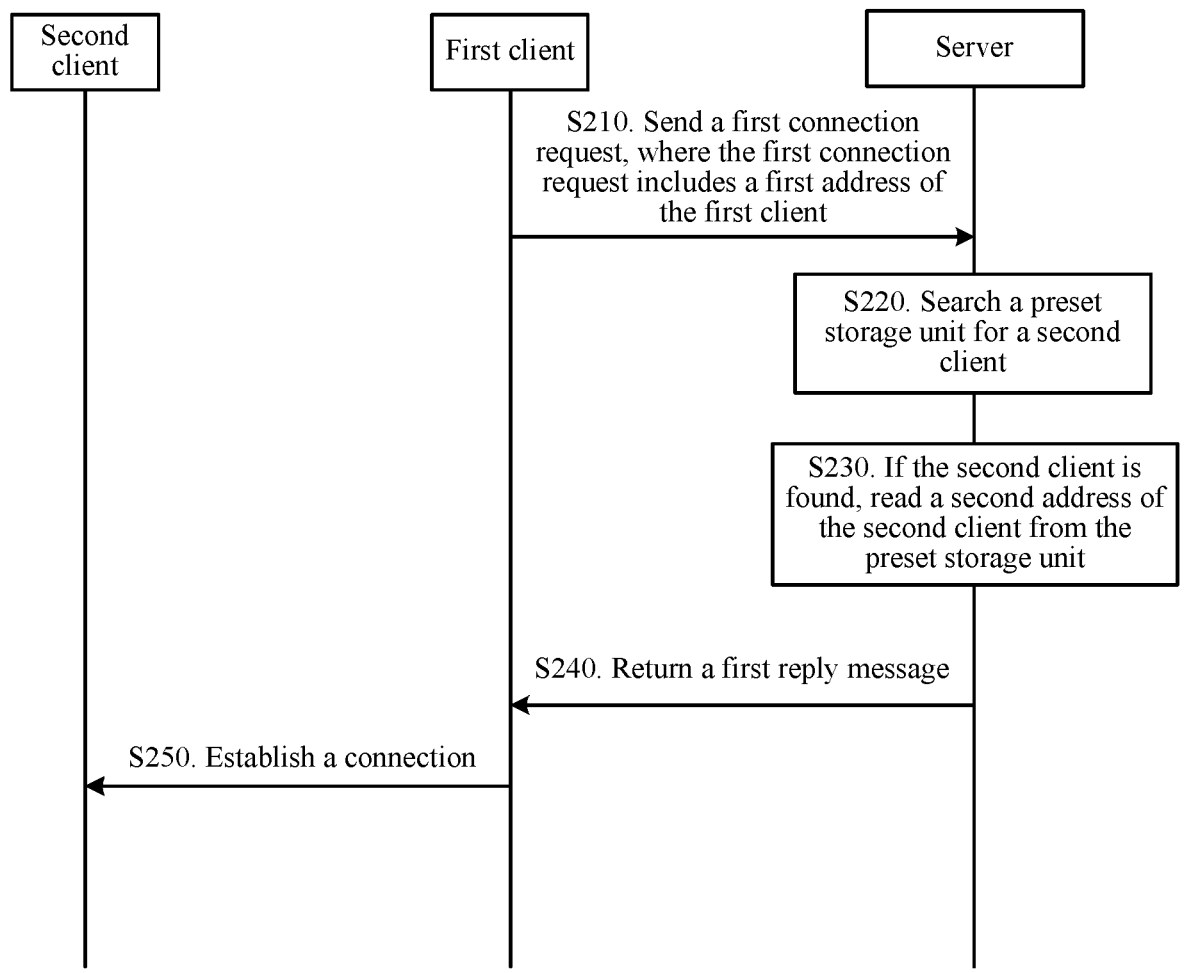
FIG. 2 is a diagram of information exchange of a data connection establishment method according to Embodiment 1 of the present invention.

FIG. 2 is a diagram of information exchange of a data connection establishment method according to Embodiment 1 of the present invention. The method may specifically include the following steps.

S210: A first client sends a first connection request to a server, where the first connection request includes a first address of the first client.

It is noted herein that the first client may be any client in FIG. 1. When the first client sends the first connection request to the server in an external network, a protocol stack may allocate a corresponding first address to the first client. The first address of the first client may include an IP address and a port of the first client.

For example, the IP address in the first address of the first client is: 218.25.245.2, and the port of the first client is: a. The first connection request may include: 218.25.245.2. In addition, the first connection request may also include the port a.

S220: The server searches a preset storage unit for a second client according to the first address of the first client, where the preset storage unit is configured to store all clients having established a connection to the server and first addresses and second addresses of all the clients, and the second client is a client belonging to a same local area network with the first client.

The preset storage unit herein is configured to store data, and may be a preset relationship database, a preset file, or the like. The second client may be a client in FIG. 1 that belongs to a same local area network with the first client and that has established a long connection to the server, and may correspond to a first address and a second address. For example, the first client is a client 01 in FIG. 1, and it is assumed that a client 00 and a client n0 have established a long connection to the server. If an IP address in a first address of the client 00 is: 218.25.245.2, an IP address in a second address of the client 00 is: 192.168.0.0, an IP address in a first address of the client n0 is: 218.25.245.3, and an IP address in a second address of the client n0 is: 192.168.1.0, content of the preset storage unit may be shown in Table 1.

TABLE 1

| Clients having established a long connection to the server | | | Corresponding clients in a same local area network | |
|---|---|---|---|---|
| Device name | Second address | First address | Device name | Second address |
| Client 00 | IP address: 192.168.0.0; Listening port: 2110 | IP address: 218.25.245.2; Port: a | AA | XX |
| Client n0 | IP address: 192.168.1.0; Listening port: 2100 | IP address: 218.25.245.3; Port: b | BB | YY |

In Table 1, the client 00 and the client n0 have established the long connection to the server, AA is a client (or a device) belonging to a same local area network with the client 00, and BB is a client (or a device) belonging to a same local area network with the client n0. Certainly, the content of Table 1 is merely an implementation of the preset storage unit. In another implementation, a port in the first address may not be stored. For example, the port a and the port b may not be stored.

In S220, the process of searching a preset storage unit for a second client according to the first address of the first client may be specifically: reading, in sequence, an IP address in a first address of each client that is in the preset storage unit, and comparing the read IP address in the first address of each client with an IP address in the first address of the first client.

S230: If finding the second client, the server reads a second address of the second client.

S240: The server returns a first reply message to the first client, where the first reply message includes the second address of the second client.

In the foregoing example, when it is found through comparison that an IP address in a first address of any client is the same as an IP address in the first address of the first client, it may be considered that the second client is found.

Certainly, during actual application, thousands of clients may be in a same local area network. Therefore, multiple clients may be selected from the thousands of clients to establish a long connection to the server. When the server establishes the long connection to the multiple clients in the same local area network, if the first client in the local area network requests to establish a connection to the server, the server may search Table 1 for multiple second clients to be selected. When the multiple second clients to be selected are found, a final second client may be selected, according to a preset algorithm, from the multiple second clients to be selected. A function of the preset algorithm herein may be: comparing stability of the multiple second clients to be selected, and selecting a second client having highest stability as the final second client; or may be: calculating a quantity of resource consumption of the multiple second clients to be selected, and selecting a second client having lowest quantity of resource consumption as the final second client.

In the foregoing example, assuming that the found or the selected second client is the client 00 in FIG. 1, the server reads the second address of the client 00 from Table 1, and returns a first reply message to the client 01, where the first reply message includes: 192.168.0.0 and 2110, that is, includes the second address of the second client.

S250: The first client establishes a connection to the second client according to the second address of the second client.

That is, the first reply message is used to instruct the first client to establish the connection to the second client.

In the foregoing example, after receiving the first reply message, the client 01 sends, according to the IP address: 192.168.0.0 and a listening port: 2110 in the second address of the client 00, a connection request to the client 00. After the client 00 returns a reply message to the client 01 according to the received connection request, a connection between the client 00 and the client 01 is established.

Optionally, after step S250 is performed, the method may further include the following step: sending, by the first client to the server, a message used to indicate that the connection between the first client and the second client is established; recording, by the server, a correspondence between the first client and the second client in the preset storage unit; returning, by the server, a first instruction message to the first client; and disconnecting, by the first client, from the server according to the first instruction message.

In the foregoing example, after establishing the connection to the client 00, the client 01 returns, to the server, a message used to indicate that the connection between the client 00 and the client 01 is established. After receiving the message, the server may record a correspondence between the client 00 and the client 01 in Table 1, or may record a correspondence between the client 00 and the client 01 in another preset storage unit different from Table 1. When the correspondence between the client 00 and the client 01 is recorded in Table 1, content of the updated Table 1 may be shown in Table 2.

TABLE 2

| Clients having established a long connection to the server | | | Corresponding clients in a same local area network | |
|---|---|---|---|---|
| Device name | Second address | First address | Device name | Second address |
| Client 00 | IP address: 192.168.0.0; Listening port: 2110 | IP address: 218.25.245.2; Port: a | AA Client 01 | XX IP address: 192.168.0.1; Listening port: 2111 |
| Client n0 | IP address: 192.168.1.0; Listening port: 2100 | IP address: 218.25.245.3; Port: b | BB | YY |

In Table 2, when the correspondence between the client 00 and the client 01 is recorded, an IP address and a listening port in a second address of the client 01 may also be recorded.

After recording the correspondence between the client 00 and the client 01 in Table 2, the server returns a first instruction message to the client 01, where the first instruction message is used to instruct the client 01 to disconnect from the server.

It can be understood that after the connection relationship between the first client and the second client is established, the server transmits data to the first client by using the second client.

Specifically, when sending a data message to the first client, the server obtains the second client from the correspondence between the first client and the second client, and reads a first address of the second client from the preset storage unit; the server sends a first identification message to the second client according to the first address of the second client, where the first identification message is used to instruct the second client to send a first notification message to the first client, where the first notification message is used to instruct the first client to send a second connection request to the server, to establish a connection between the server and the first client; and the server sends the data message to the first client, and after the data message is sent, returns a second instruction message to the first client, where the second instruction message is used to instruct the first client to disconnect from the server.

Figure 3:
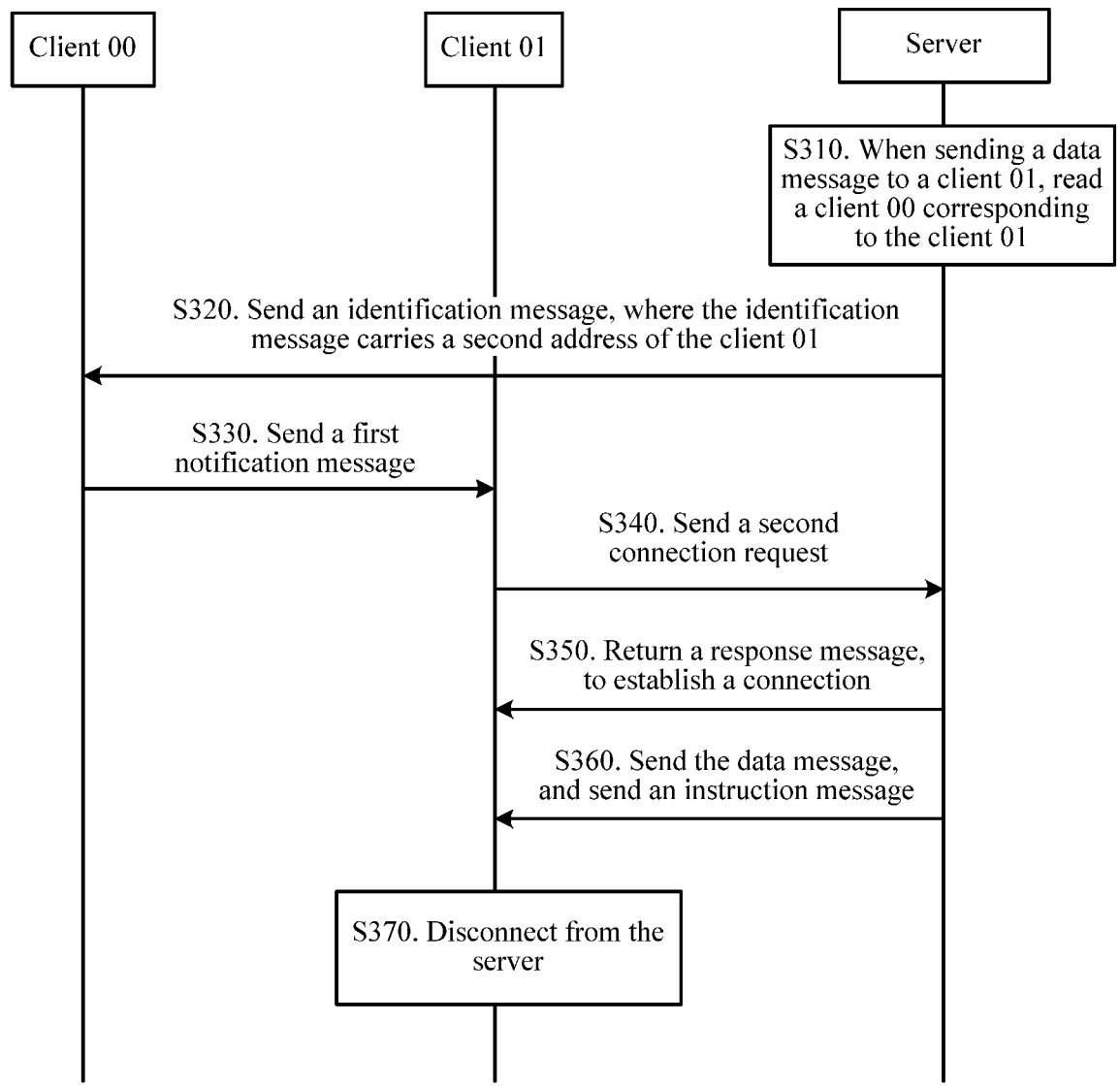
FIG. 3 is a diagram of information exchange according to the present invention.

Referring to FIG. 3, which is a diagram of information exchange according to the present invention. In FIG. 3, when sending a message to a client 01, a server first searches the column "clients having established a long connection to the server" in Table 1 for the client 01; and if the client 01 is found, directly sends a message to the client 01 according to a first address of the client 01; or if the client 01 is not found, it indicates that the server does not establish a long connection to the client 01. In this case, if a correspondence between the client 01 and the client 00 is recorded in Table 1, the server reads the client 00 corresponding to the client 01 from Table 1; otherwise, the server reads the client 00 corresponding to the client 01 from another preset storage unit; later, the server reads an IP address and a port in a first address of the client 00.

In FIG. 3, after reading the first address of the client 00, the server sends a first identification message to the client 00, where the first identification message may be an IP address: 192.168.0.1 in a second address of the client 01. After receiving the first identification message, the client 00 sends a first notification message to the client 01, where the first notification message is used to instruct the client 01 to send a second connection request to the server. After the server returns a second reply message to the client 01, a connection between the server and the client 01 is established. After the connection between the server and the client 01 is established, the server sends a data message to the client 01. After the data message is sent, the server returns a second instruction message to the client 01, where the second instruction message is used to instruct the client 01 to disconnect from the server. In this way, a quantity of long connections between the server and clients can be effectively reduced, and network resources are saved.

It should be further noted that, described in the foregoing steps is a case in which the second client is found in the preset storage unit. When the second client is not found, this embodiment of the present invention may further include the following steps: if the server does not find the second client, storing, by the server, the second address of the first client in the preset storage unit, and returning a second reply message to the first client; and establishing, by the first client, a connection to the server according to the received second reply message.

When it is found through comparison that none of IP addresses in the first addresses of the clients in the preset storage unit is the same as an IP address in the first address of the first client, or multiple found second clients to be selected are all fully loaded, that is, a final second client cannot be selected, according to a preset algorithm, from the multiple second clients to be selected, it is considered that the second client is not found.

In the foregoing example, if the client 00 is not found, the server records the first address and the second address of the client 01 in Table 1, and returns a second reply message to the client 01, to establish a connection between the server and the client 01. To maintain the long connection between the server and the client 01, the client 01 sends a heartbeat message to the server, where the heartbeat message is used to maintain the connection between the server and the client 01.

Figure 4:
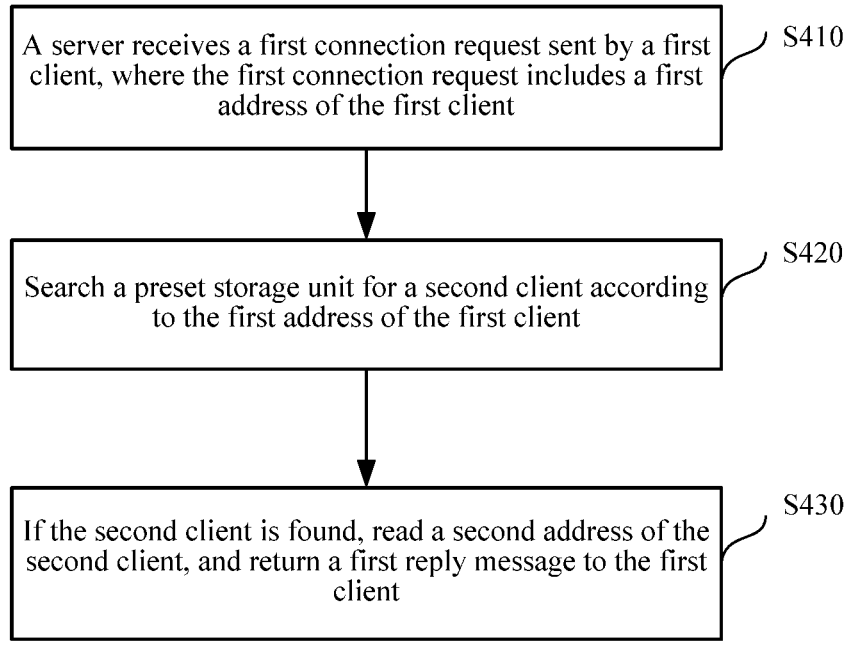
FIG. 4 is a flowchart of a data connection establishment method according to Embodiment 2 of the present invention.

FIG. 4 is a flowchart of a data connection establishment method according to Embodiment 2 of the present invention. The method may be performed by the server in FIG. 1. As shown in FIG. 4, the method may specifically include the following steps.

S410: A server receives a first connection request sent by a first client, where the first connection request includes a first address of the first client.

It is noted herein that the first client may be any client in FIG. 1. When the first client sends the first connection request to the server in an external network, a protocol stack may allocate a corresponding first address to the first client. The first address of the first client may include an IP address and a port of the first client.

For example, the IP address in the first address of the first client is: 218.25.245.2, and the port of the first client is: a. The first connection request may include: 218.25.245.2. In addition, the first connection request may also include the port a.

S420: Search a preset storage unit for a second client according to the first address of the first client, where the preset storage unit is configured to store all clients having established a connection to the server and first addresses and second addresses of all the clients, and the second client is a client belonging to a same local area network with the first client.

The preset storage unit herein is configured to store data, and may be a preset relationship database, a preset file, or the like. The second client may be a client in FIG. 1 that belongs to a same local area network with the first client and that has established a long connection to the server, and may correspond to a first address and a second address. For example, the first client is a client 01 in FIG. 1, and it is assumed that a client 00 and a client no have established a long connection to the server. If an IP address in a first address of the client 00 is: 218.25.245.2, an IP address in a second address of the client 00 is: 192.168.0.0, an IP address in a first address of the client no is: 218.25.245.3, and an IP address in a second address of the client no is: 192.168.1.0, content of the preset storage unit may be shown in Table 1.

In S420, the process of searching a preset storage unit for a second client according to the first address of the first client may be specifically: reading, in sequence, an IP address in a first address of each client that is in the preset storage unit, and comparing the read IP address in the first address of each client with an IP address in the first address of the first client.

S430: If the second client is found, read a second address of the second client, and return a first reply message to the first client, where the first reply message includes the second address of the second client, and the first reply message is used to instruct the first client to establish a connection to the second client.

In the foregoing example, when it is found through comparison that an IP address in a first address of any client is the same as an IP address in the first address of the first client, it may be considered that the second client is found.

Certainly, during actual application, thousands of clients may be in a same local area network. Therefore, multiple clients may be selected from the thousands of clients to establish a long connection to the server. When the server establishes the long connection to the multiple clients in the same local area network, if the first client in the local area network requests to establish a connection to the server, the server may search Table 1 for multiple second clients to be selected. When the multiple second clients to be selected are found, a final second client may be selected, according to a preset algorithm, from the multiple second clients to be selected. A function of the preset algorithm herein may be: comparing stability of the multiple second clients to be selected, and selecting a second client having highest stability as the final second client; or may be: calculating a quantity of resource consumption of the multiple second clients to be selected, and selecting a second client having lowest quantity of resource consumption as the final second client.

In the foregoing example, assuming that the found or the selected second client is the client 00 in FIG. 1, the server reads the second address of the client 00 from Table 1, and returns a first reply message to the client 01, where the first reply message includes: 192.168.0.0 and 2110, that is, includes the second address of the second client. After receiving the first reply message, the client 01 sends, according to the IP address: 192.168.0.0 and a listening port: 2110 in the second address of the client 00, a connection request to the client 00. After the client 00 returns a reply message to the client 01 according to the received connection request, a connection between the client 00 and the client 01 is established.

Optionally, after step S430 is performed, the method may further include the following step: sending, by the first client to the server, a message used to indicate that the connection between the first client and the second client is established; recording, by the server, a correspondence between the first client and the second client in the preset storage unit; returning, by the server, a first instruction message to the first client; and disconnecting, by the first client, from the server according to the first instruction message.

It can be understood that after the connection between the first client and the second client is established, the server may transmit data to the first client by using the second client. A specific transmission process is as described in Embodiment 1 of the present invention, and details are not described herein.

Optionally, when the first client is disconnected from the second client, this embodiment of the present invention may further include the following steps: receiving a third connection request sent by the first client; searching the preset storage unit for a third client, where the third client is a client belonging to the same local area network with the first client; if the third client is found, instructing the first client to establish a connection to the third client; and transmitting, by the server, data to the first client by using the third client.

For example, when the client 00 leaves the local area network to which the client 00 and the client 01 belong (for example, leaving a range of a WiFi hotspot, or switching from a WiFi network to a cellular network, or the client 00 is shut down), the client 01 may not receive a message sent by the client 00 in a preset time range. Therefore, the client 01 determines that the connection to the client 00 is cut off. In this case, the server receives a third connection request sent by the client 01. After receiving the third connection request, the server searches the preset storage unit for a third client. The third client herein belongs to the same local area network with the client 01, and the third client establishes a connection to the server. If the third client is found, the server returns a second address of the third client to the client 01, so that the client 01 establishes a connection to the third client according to the second address of the third client.

It should be noted that for a process of establishing the connection between the third client and the first client, reference may be made to the process of establishing the connection between the second client and the first client in step S430, and details are not described herein.

In addition, after the connection relationship between the first client and the third client is established, the server transmits data to the first client by using the third client. A specific transmission process is as described in Embodiment 1 of the present invention, and details are not described herein.

If the third client is not found, a third reply message is returned, where the third reply message does not include a second address of the third client. The first client establishes a connection to the server according to the third reply message.

Optionally, when a connection address of the second client changes or the server is disconnected from the second client, the method may further include the following steps: receiving a fourth connection request sent by the first client; searching the preset storage unit for a fourth client according to the fourth connection request, where the fourth client is a client belonging to the same local area network with the first client; if the fourth client is found, instructing the first client to establish a connection to the fourth client; and transmitting, by the server, data to the first client by using the fourth client.

In the foregoing example, when the server does not receive a heartbeat message sent by the client 00 in a preset time range, the server determines that the server is disconnected from the client 00. Alternatively, the server determines, according to a message received from the client 00, that a connection address of the client 00 changes. In this case, if receiving a fourth connection request sent by the client 01, the server searches the preset storage unit for a fourth client according to a first address that is of the client 01 and that is carried in the fourth connection request. The fourth client herein belongs to the same local area network with the client 01, and the fourth client establishes a connection to the server. If the fourth client is found, the server returns a second address of the fourth client to the client 01, so that the client 01 establishes a connection to the fourth client according to the second address of the fourth client.

It should be noted that for a process of establishing the connection between the fourth client and the first client, reference may be made to the process of establishing the connection between the second client and the first client in step S430, and details are not described herein.

In addition, after the connection relationship between the first client and the fourth client is established, the server transmits data to the first client by using the fourth client. A specific transmission process is as described in Embodiment 1 of the present invention, and details are not described herein.

If the fourth client is not found, a fourth reply message is returned, where the fourth reply message does not include a second address of the fourth client. The first client establishes a connection to the server according to the fourth reply message.

Optionally, in step S410, the first connection request may also include a second address of the first client.

It should be further noted that, described in the foregoing embodiment is a case in which the second client is found in the preset storage unit. When the second client is not found, this embodiment of the present invention may further include the following step: if the second client is not found, storing the second address of the first client in the preset storage unit, and establishing a connection to the first client.

When it is found through comparison that none of IP addresses in the first addresses of the clients that are in the preset storage unit is the same as an IP address in the first address of the first client, or multiple found second clients to be selected are all fully loaded, that is, a final second client cannot be selected, according to a preset algorithm, from the multiple second clients to be selected, it is considered that the second client is not found.

In the foregoing example, if the client 00 is not found, the server records the first address and the second address of the client 01 in Table 1, and returns a second reply message to the client 01, to establish a connection between the server and the client 01. To maintain the long connection between the server and the client 01, the client 01 sends a heartbeat message to the server, where the heartbeat message is used to maintain the connection between the server and the client 01.

By means of the data connection establishment method provided in this embodiment of the present invention, after receiving a connection request sent by a first client, a server determines whether a connection to a second client belonging to a same local area network with the first client has already been established; if yes, returns, to the first client, a reply message used to instruct the first client to establish a connection to the second client; and disconnects from the first client after the connection between the first client and the second client is established. Therefore, a quantity of long connections between devices can be effectively reduced, and network resources are saved.

Figure 5:
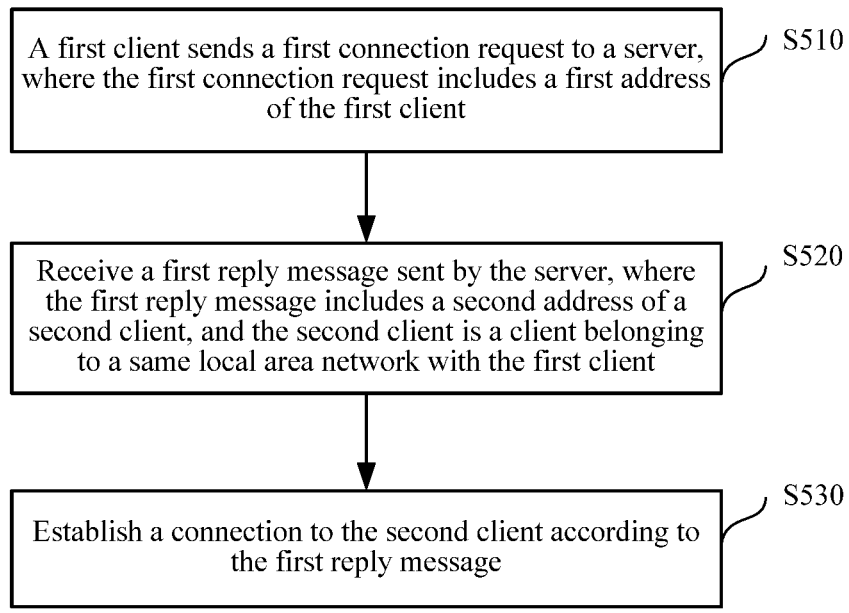
FIG. 5 is a flowchart of a data connection establishment method according to Embodiment 3 of the present invention.

FIG. 5 is a schematic diagram of a data connection establishment method according to Embodiment 3 of the present invention. The method may be performed by a client in FIG. 1. As shown in FIG. 5, the method may specifically include the following steps.

S510: A first client sends a first connection request to a server, where the first connection request includes a first address of the first client.

It is noted herein that the first client may be any client in FIG. 1. When the first client sends the first connection request to the server in an external network, a protocol stack may allocate a corresponding first address to the first client. The first address of the first client may include an IP address and a port of the first client.

For example, the IP address in the first address of the first client is: 218.25.245.2, and the port of the first client is: a. The first connection request may include: 218.25.245.2. In addition, the first connection request may also include the port a.

After receiving the first connection request sent by the first client herein, the server searches a preset storage unit for a second client according to the first address of the first client. The preset storage unit herein is configured to store data, and may be a preset relationship database, a preset file, or the like. The second client may be a client in FIG. 1 that belongs to a same local area network with the first client and that has established a long connection to the server, and may correspond to a first address and a second address. For example, the first client is a client 01 in FIG. 1, and it is assumed that a client 00 and a client no have established a long connection to the server. If an IP address in a first address of the client 00 is: 218.25.245.2, an IP address in a second address of the client 00 is: 192.168.0.0, an IP address in a first address of the client no is: 218.25.245.3, and an IP address in a second address of the client no is: 192.168.1.0, content of the preset storage unit may be shown in Table 1. In Table 1, the client 00 and the client no have established the long connection to the server, AA is a client (or a device) belonging to a same local area network with the client 00, and BB is a client (or a device) belonging to a same local area network with the client no. Certainly, the content of Table 1 is merely an implementation of the preset storage unit. In another implementation, a port in the first address may not be stored. For example, the port a and the port b may not be stored.

The process of searching a preset storage unit for a second client according to the first address of the first client may be specifically: reading, in sequence, an IP address in a first address of each client that is in the preset storage unit, and comparing the read IP address in the first address of each client with an IP address in the first address of the first client.

S520: Receive a first reply message sent by the server, where the first reply message includes a second address of the second client, and the second client is a client belonging to a same local area network with the first client.

In the foregoing example, when it is found through comparison that an IP address in a first address of any client is the same as an IP address in the first address of the first client, it may be considered that the second client is found.

Certainly, during actual application, thousands of clients may be in a same local area network. Therefore, multiple clients may be selected from the thousands of clients to establish a long connection to the server. When the server establishes the long connection to the multiple clients in the same local area network, if the first client in the local area network requests to establish a connection to the server, the server may search Table 1 for multiple second clients to be selected. When the multiple second clients to be selected are found, a final second client may be selected, according to a preset algorithm, from the multiple second clients to be selected. A function of the preset algorithm herein may be: comparing stability of the multiple second clients to be selected, and selecting a second client having highest stability as the final second client; or may be: calculating a quantity of resource consumption of the multiple second clients to be selected, and selecting a second client having lowest quantity of resource consumption as the final second client.

In the foregoing example, assuming that the found or the selected second client is the client 00 in FIG. 1, the server reads the second address of the client 00 from Table 1, and returns a first reply message to the client 01, where the first reply message includes: 192.168.0.0 and 2110, that is, includes the second address of the second client.

S530: Establish a connection to the second client according to the first reply message.

That is, the first reply message is used to instruct the first client to establish the connection to the second client.

After receiving the first reply message, the client 01 sends, according to the IP address: 192.168.0.0 and a listening port: 2110 in the second address of the client 00, a connection request to the client 00. After the client 00 returns a reply message to the client 01 according to the received connection request, a connection between the client 00 and the client 01 is established.

Optionally, after step S530 is performed, the method may further include the following step: sending, by the first client to the server, a message used to indicate that the connection between the first client and the second client is established; recording, by the server, a correspondence between the first client and the second client in the preset storage unit; returning, by the server, a first instruction message to the first client; and disconnecting, by the first client, from the server according to the first instruction message.

It can be understood that after the connection between the first client and the second client is established, the server may transmit data to the first client by using the second client. A specific transmission process is as described in Embodiment 1 of the present invention, and details are not described herein.

Optionally, when the first client is disconnected from the second client, this embodiment of the present invention may further include the following steps: sending a third connection request to the server; receiving a third reply message sent by the server, where the third reply message includes a second address of a third client, and the third client is a client belonging to the same local area network with the first client; establishing a connection to the third client according to the third reply message; and transmitting, by the first client, data to the server by using the third client.

For example, when the client 00 leaves the local area network to which the client 00 and the client 01 belong (for example, leaving a range of a WiFi hotspot, or switching from a WiFi network to a cellular network, or the client 10 is shut down), the client 01 may not receive a message sent by the client 00 in a preset time range. Therefore, the client 01 determines that the connection to the client 00 is cut off. In this case, the server receives a third connection request sent by the client 01. After receiving the third connection request, the server searches the preset storage unit for a third client. The third client herein belongs to the same local area network with the client 01, and the third client establishes a connection to the server. If the third client is found, the server returns a second address of the third client to the client 01, so that the client 01 establishes a connection to the third client according to the second address of the third client.

It should be noted that for a process of establishing the connection between the third client and the first client, reference may be made to the process of establishing the connection between the second client and the first client in step S530, and details are not described herein.

In addition, after the connection relationship between the first client and the third client is established, the server transmits data to the first client by using the third client. A specific transmission process is as described in Embodiment 1 of the present invention, and details are not described herein.

If the third client is not found, a third reply message is returned, where the third reply message does not include a second address of the third client. The first client establishes a connection to the server according to the third reply message.

Optionally, when a connection address of the second client changes or the server is disconnected from the second client, the method may further include the following steps: sending a fourth connection request to the server; receiving a fourth reply message sent by the server, where the fourth reply message includes a second address of a fourth client, and the fourth client is a client belonging to the same local area network with the first client; establishing a connection to the fourth client according to the fourth reply message; and transmitting, by the first client, data to the server by using the fourth client.

In the foregoing example, when the server does not receive a heartbeat message sent by the client 00 in a preset time range, the server determines that the server is disconnected from the client 00. Alternatively, the server determines, according to a message received from the client 00, that a connection address of the client 00 changes. In this case, if receiving a fourth connection request sent by the client 01, the server searches the preset storage unit for a fourth client according to a first address that is of the client 01 and that is carried in the fourth connection request. The fourth client herein belongs to the same local area network with the client 01, and the fourth client establishes a connection to the server. If the fourth client is found, the server returns a second address of the fourth client to the client 01, so that the client 01 establishes a connection to the fourth client according to the second address of the fourth client.

It should be noted that for a process of establishing the connection between the fourth client and the first client, reference may be made to the process of establishing the connection between the second client and the first client in step S530, and details are not described herein.

In addition, after the connection relationship between the first client and the fourth client is established, the server transmits data to the first client by using the fourth client. A specific transmission process is as described in Embodiment 1 of the present invention, and details are not described herein.

If the fourth client is not found, a fourth reply message is returned, where the fourth reply message does not include a second address of the fourth client. The first client establishes a connection to the server according to the fourth reply message.

Optionally, in step S510, the first connection request may also include a second address of the first client.

It should be noted that, described in the foregoing embodiment is a case in which the second reply message includes the second address of the second client. When the second reply message does not include the second address of the second client, this embodiment of the present invention may further include the following steps: receiving a second reply message sent by the server, where the second reply message does not include the second address of the second client; and establishing a connection to the server according to the second reply message.

When it is found through comparison that none of IP addresses in the first addresses of the clients that are in the preset storage unit is the same as an IP address in the first address of the first client, or multiple found second clients to be selected are all fully loaded, that is, a final second client cannot be selected, according to a preset algorithm, from the multiple second clients to be selected, it is considered that the second client is not found, and the second reply message returned by the server to the first client does not include the second address of the second client.

In the foregoing example, if the client 00 is not found, the server records the first address and the second address of the client 01 in Table 1, and returns a second reply message to the client 01, to establish a connection between the server and the client 01. To maintain the long connection between the server and the client 01, the client 01 sends a heartbeat message to the server, where the heartbeat message is used to maintain the connection between the server and the client 01.

By means of the data connection establishment method provided in this embodiment of the present invention, after receiving a connection request sent by a first client, a server determines whether a connection to a second client belonging to a same local area network with the first client has already been established; if yes, returns, to the first client, a reply message used to instruct the first client to establish a connection to the second client; and disconnects from the first client after the connection between the first client and the second client is established. Therefore, a quantity of long connections between devices can be effectively reduced, and network resources are saved.

Figure 6:
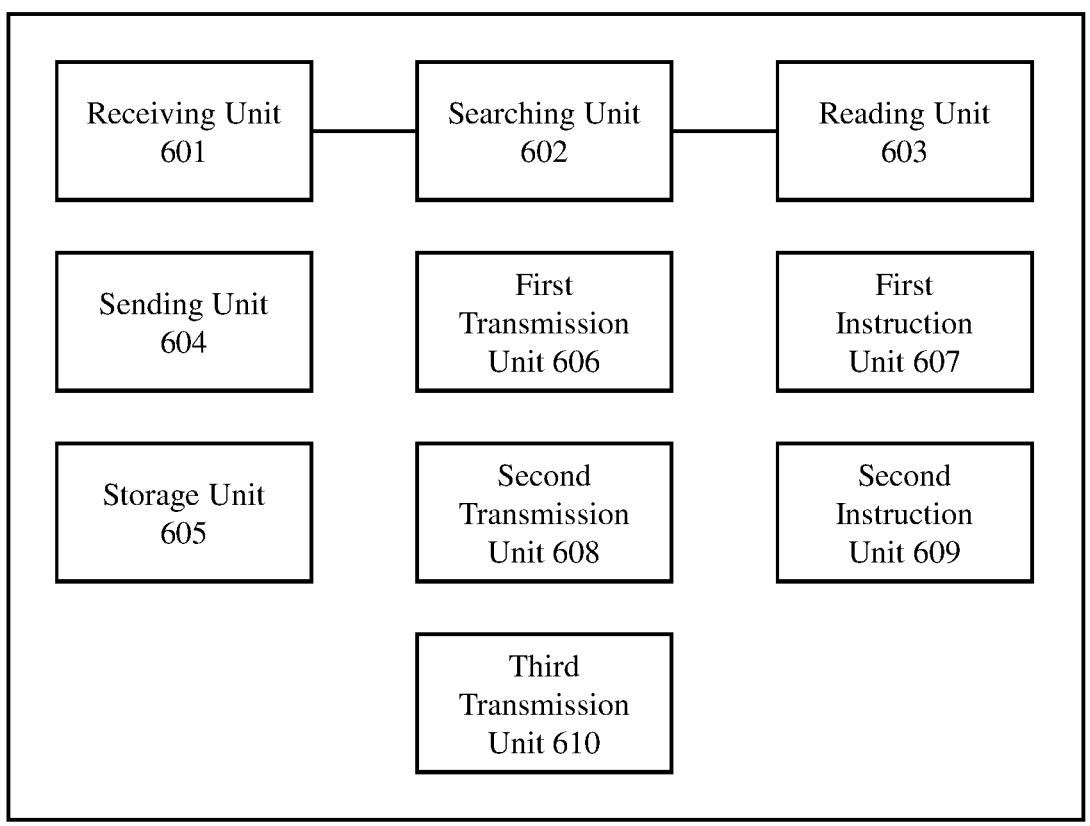
FIG. 6 is a schematic diagram of a server according to Embodiment 4 of the present invention.

FIG. 6 is a schematic diagram of a server according to Embodiment 4 of the present invention. The server may be configured to perform the method shown in FIG. 4. In FIG. 6, the server includes: a receiving unit 601, a searching unit 602, a sending unit 604, and a reading unit 603.

The receiving unit 601 is configured to receive a first connection request sent by a first client, where the first connection request includes a first address of the first client.

The searching unit 602 is configured to search a preset storage unit for a second client according to the first address of the first client received by the receiving unit 601, where the preset storage unit is configured to store all clients having established a connection to the server and first addresses and second addresses of all the clients, and the second client is a client belonging to a same local area network with the first client.

The reading unit 603 is configured to: if the searching unit 602 finds the second client, read a second address of the second client.

The sending unit 604 is configured to return a first reply message to the first client, where the first reply message includes the second address of the second client, and the first reply message is used to instruct the first client to establish a connection to the second client.

Optionally, the server further includes: a storage unit 605.

The storage unit 605 is configured to: if the searching unit 602 does not find the second client, store a second address of the first client in the preset storage unit, and establish a connection to the first client.

Optionally, the server further includes: a first transmission unit 606.

The first transmission unit 606 is configured to transmit data to the first client by using the second client.

Optionally, the server further includes: a first instruction unit 607 and a second transmission unit 608.

The receiving unit 601 is further configured to receive a third connection request sent by the first client.

The searching unit 602 is further configured to search the preset storage unit for a third client, where the third client is a client belonging to the same local area network with the first client.

The first instruction unit 607 is configured to: if the searching unit 602 finds the third client, instruct the first client to establish a connection to the third client.

The second transmission unit 608 is further configured to transmit data to the first client by using the third client.

Optionally, the server further includes: a second instruction unit 609 and a third transmission unit 610.

The receiving unit 601 is further configured to receive a fourth connection request sent by the first client.

The searching unit 602 is further configured to search the preset storage unit for a fourth client according to the fourth connection request received by the receiving unit 601, where the fourth client is a client belonging to the same local area network with the first client.

The second instruction unit 609 is configured to: if the searching unit 602 finds the fourth client, instruct the first client to establish a connection to the fourth client.

The third transmission unit 610 is configured to transmit data to the first client by using the fourth client.

Functions of the function modules of the apparatus in this embodiment of the present invention may be implemented by using the steps in the foregoing method embodiment. Therefore, a specific operation process of the apparatus provided in the present invention is not described herein again.

After receiving a connection request sent by a first client, the server provided in this embodiment of the present invention determines whether a connection to a second client belonging to a same local area network with the first client has already been established; if yes, returns, to the first client, a reply message used to instruct the first client to establish a connection to the second client; and disconnects from the first client after the connection between the first client and the second client is established. Therefore, a quantity of long connections between devices can be effectively reduced, and network resources are saved.

Figure 7:
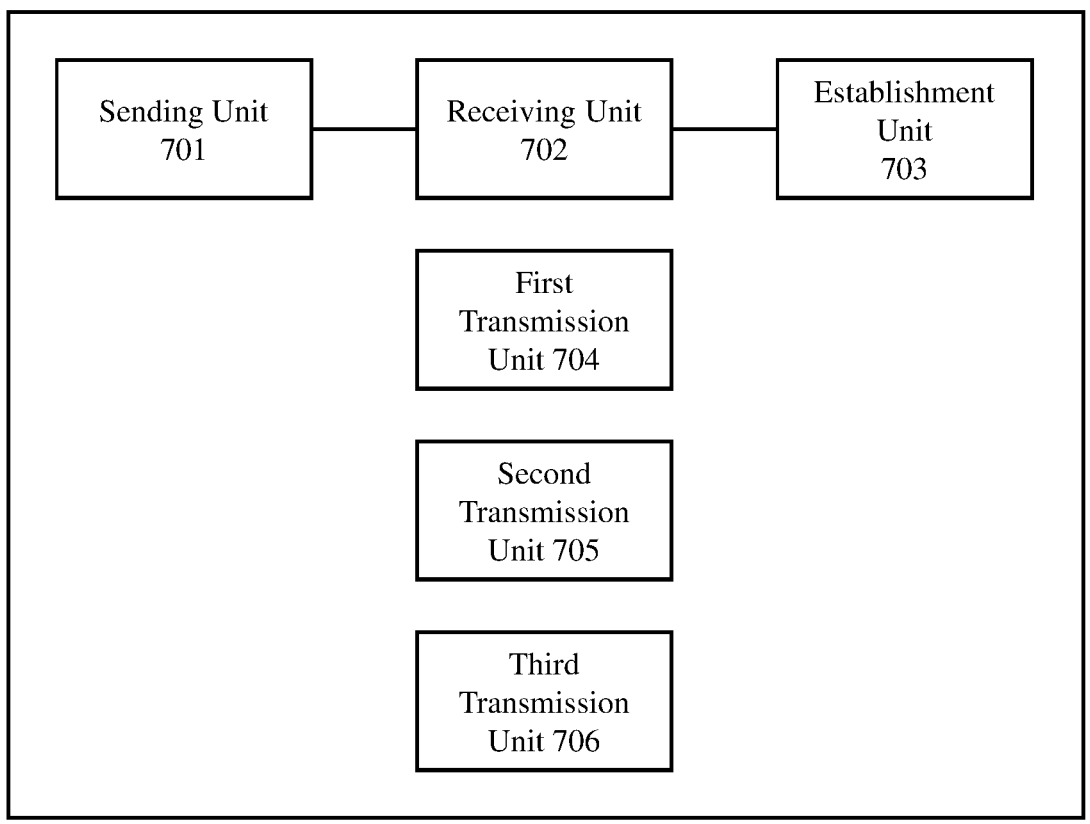
FIG. 7 is a schematic diagram of a mobile terminal according to Embodiment 5 of the present invention.

FIG. 7 is a schematic diagram of a mobile terminal according to Embodiment 5 of the present invention. The mobile terminal may be configured to perform the method shown in FIG. 5. In FIG. 7, the mobile terminal includes: a sending unit 701, a receiving unit 702, and an establishment unit 703.

The sending unit 701 is configured to send a first connection request to a server, where the first connection request includes a first address of the mobile terminal.

The receiving unit 702 is configured to receive a first reply message sent by the server, where the first reply message includes a second address of the second client, and the second client is a client belonging to a same local area network with the mobile terminal.

The establishment unit 703 is configured to establish a connection to the second client according to the first reply message received by the receiving unit 702.

Optionally, the receiving unit 702 is further configured to receive a second reply message sent by the server, where the second reply message does not include the second address of the second client.

The establishment unit 703 is further configured to establish a connection to the server according to the second reply message received by the receiving unit 702.

Optionally, the mobile terminal further includes: a first transmission unit 704.

The first transmission unit 704 is configured to transmit data to the server by using the second client.

Optionally, the mobile terminal further includes: a second transmission unit 705.

The sending unit 701 is further configured to send a third connection request to the server.

The receiving unit 702 is further configured to receive a third reply message sent by the server, where the third reply message includes a second address of a third client, and the third client is a client belonging to the same local area network with the mobile terminal.

The establishment unit 703 is further configured to establish a connection to the third client according to the third reply message received by the receiving unit 702.

The second transmission unit 705 is configured to transmit data to the server by using the third client.

Optionally, the mobile terminal further includes: a third transmission unit 706.

The sending unit 701 is further configured to send a fourth connection request to the server.

The receiving unit 702 is further configured to receive a fourth reply message sent by the server, where the fourth reply message includes a second address of a fourth client, and the fourth client is a client belonging to the same local area network with the mobile terminal.

The establishment unit 703 is further configured to establish a connection to the fourth client according to the fourth reply message received by the receiving unit 702.

The third transmission unit 706 is configured to transmit data to the server by using the fourth client.

Functions of the function modules of the apparatus in this embodiment of the present invention may be implemented by using the steps in the foregoing method embodiment. Therefore, a specific operation process of the apparatus provided in the present invention is not described herein again.

After receiving a connection request sent by a first client, the mobile terminal provided in this embodiment of the present invention determines whether a connection to a second client belonging to a same local area network with the first client has already been established; if yes, returns, to the first client, a reply message used to indicate the first client to establish a connection to the second client; and disconnects from the first client after the connection between the first client and the second client is established. Therefore, a quantity of long connections between devices can be effectively reduced, and network resources are saved.

Figure 8:
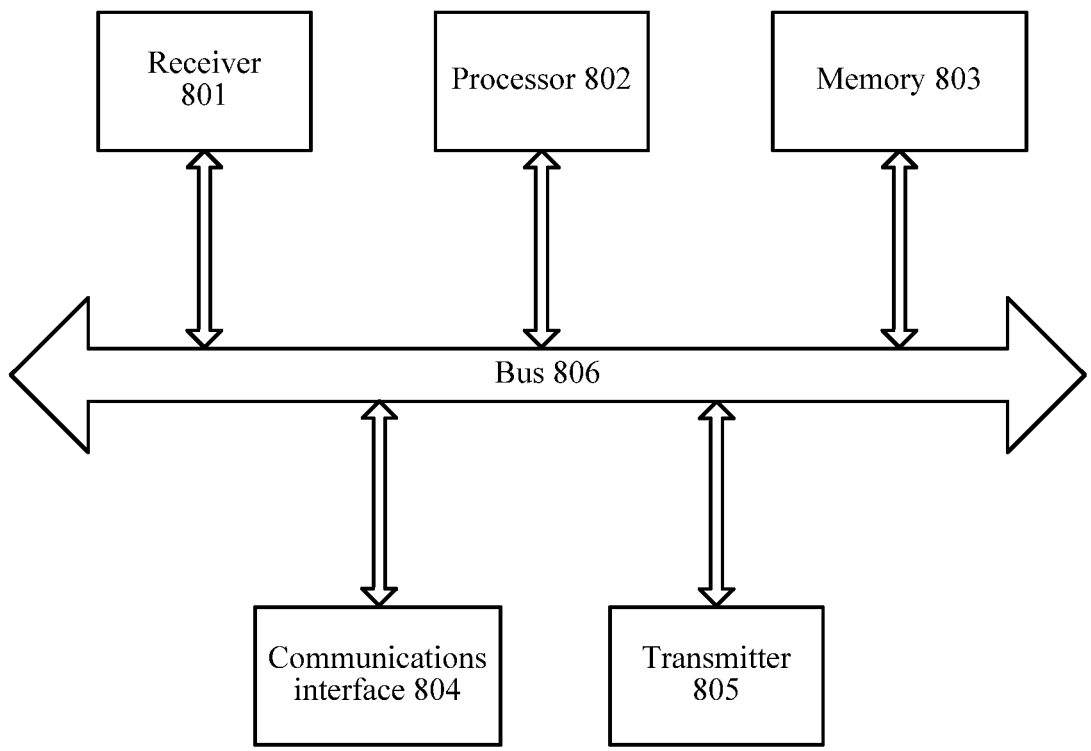
FIG. 8 is a schematic diagram of a server according to Embodiment 6 of the present invention.

FIG. 8 is a schematic diagram of a server according to Embodiment 6 of the present invention. As shown in FIG. 8, the server includes: a receiver 801, a processor 802, a memory 803, a communications interface 804, a transmitter 805, and a bus 806. The receiver 801, the processor 802, the memory 803, the communications interface 804, and the transmitter 805 perform communication by using the bus 806.

For example, the processor 802 may be a CPU.

The communications interface 804 is configured to communicate with another device.

The memory 803 may be a permanent store, for example, a hard disk drive, or a flash memory. The memory 803 has a software module and a device driver. The software module can execute various function modules of the foregoing method in the present invention. The device driver may be a network and an interface driver.

The receiver 801 is configured to receive a first connection request sent by a first client, where the first connection request includes a first address of the first client.

The processor 802 is configured to search the memory for a second client according to the first address of the first client received by the receiver 801, where the memory is configured to store all clients having established a connection to the server and first addresses and second addresses of all the clients, and the second client is a client belonging to a same local area network with the first client.

The processor 802 is further configured to: if the second client is found, read a second address of the second client.

The transmitter 805 is configured to return a first reply message to the first client, where the first reply message includes the second address of the second client, and the first reply message is used to instruct the first client to establish a connection to the second client.

Optionally, the memory 803 is configured to: if the processor does not find the second client, store a second address of the first client in the memory, and establish a connection to the first client.

Optionally, the communications interface 804 is configured to transmit data to the first client by using the second client.

Optionally, the receiver 801 is further configured to receive a third connection request sent by the first client.

The processor 802 is further configured to search the memory 803 for a third client, where the third client is a client belonging to the same local area network with the first client.

The processor 802 is further configured to: if the third client is found, instruct the first client to establish a connection to the third client.

The communications interface 804 is further configured to transmit data to the first client by using the third client.

Optionally, the receiver 801 is further configured to receive a fourth connection request sent by the first client.

The processor 802 is further configured to search the memory for a fourth client according to the fourth connection request received by the receiver 801, where the fourth client is a client belonging to the same local area network with the first client.

The processor 802 is further configured to: if the fourth client is found, instruct the first client to establish a connection to the fourth client.

The communications interface 804 is further configured to transmit data to the first client by using the fourth client.

The server provided in this embodiment of the present invention can effectively reduce a quantity of long connections between devices, so as to save network resources.

Figure 9:
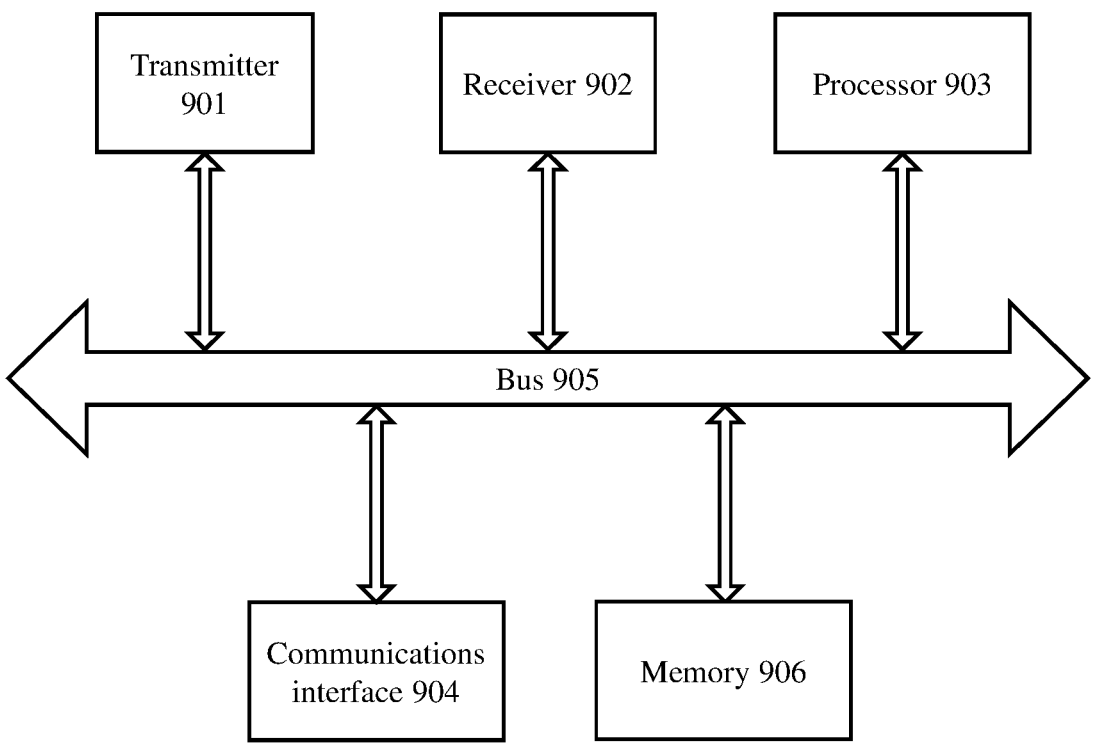
FIG. 9 is a schematic diagram of a mobile terminal according to Embodiment 7 of the present invention.

FIG. 9 is a schematic diagram of a mobile terminal according to Embodiment 7 of the present invention. As shown in FIG. 9, the mobile terminal includes: a transmitter 901, a receiver 902, a processor 903, a communications interface 904, and a bus 905. The transmitter 901, the receiver 902, the processor 903, and the communications interface 904 perform communication by using the bus 905.

For example, the processor 903 may be a CPU.

The communications interface 904 is configured to communicate with another device.

The mobile terminal may further include a memory 906, and the memory 906 is also connected to the processor 903 by using the system bus 905. The memory 906 may be a permanent store, for example, a hard disk drive, or a flash memory. The memory 906 has a software module and a device driver. The software module can execute various function modules of the foregoing method in the present invention. The device driver may be a network and an interface driver.

The transmitter 901 is configured to send a first connection request to a server, where the first connection request includes a first address of the mobile terminal.

The receiver 902 is configured to receive a first reply message sent by the server, where the first reply message includes a second address of the second client, and the second client is a client belonging to a same local area network with the mobile terminal.

The processor 903 is configured to establish a connection to the second client according to the first reply message received by the receiver 902.

Optionally, the receiver 902 is further configured to receive a second reply message sent by the server, where the second reply message does not include the second address of the second client.

The processor 903 is further configured to establish a connection to the server according to the second reply message received by the receiver 902.

Optionally, the communications interface 904 is configured to transmit data to the server by using the second client.

Optionally, the transmitter 901 is further configured to send a third connection request to the server.

The receiver 902 is further configured to receive a third reply message sent by the server, where the third reply message includes a second address of a third client, and the third client is a client belonging to the same local area network with the mobile terminal.

The processor 903 is further configured to establish a connection to the third client according to the third reply message received by the receiver 902.

The communications interface 904 is further configured to transmit data to the server by using the third client.

Optionally, the transmitter 901 is further configured to send a fourth connection request to the server.

The receiver 902 is further configured to receive a fourth reply message sent by the server, where the fourth reply message includes a second address of a fourth client, and the fourth client is a client belonging to the same local area network with the mobile terminal.

The processor 903 is further configured to establish a connection to the fourth client according to the fourth reply message received by the receiver 902.

The communications interface 904 is further configured to transmit data to the server by using the fourth client.

The mobile terminal provided in this embodiment of the present invention can effectively reduce a quantity of long connections between devices, so as to save network resources.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method, comprising:
    sending, by a first client, a first connection request to a server, wherein the first connection request comprises a first address of the first client;
    searching, by the server, a storage device for a second client according to the first address of the first client, wherein the storage device is configured to store an identifier of each of a plurality of clients that have established a connection to the server, and configured to store a first address and a second address of each of the plurality of clients that have established the connection to the server, and wherein the second client belongs to a same local area network as the first client; and
    in response to the server finding the second client, reading, by the server, a second address of the second client from the storage device, and returning a first reply message to the first client, wherein the first reply message comprises the second address of the second client;
and
    in response to receiving the first reply message, establishing, by the first client, a connection to the second client according to the second address of the second client.

2. The method according to claim 1, wherein the first connection request further comprises a second address of the first client, and the method further comprises:
    in response to the server not finding the second client in the search, storing, by the server, the second address of the first client in the storage device, and returning a second reply message to the first client; and
    establishing, by the first client, a connection to the server according to the received second reply message.

3. The method according to claim 2, wherein after establishing the connection to the first client, the method further comprises:
    transmitting, by the server, data to the first client using the second client.

4. The method according to claim 1, wherein the server finds the second client by determining that the first address of the second client matches the first address of the first client.

5. The method according to claim 1, further comprising:
    sending, by the first client to the server, a message indicating that the connection between the first client and the second client is established.

6. A server, comprising:
    a receiver, configured to receive a first connection request sent by a first client, wherein the first connection request comprises a first address of the first client;
    a memory, configured to store an identifier of each of a plurality of clients that have established a connection to the server, and configured to store a first address and a second address for each of the plurality of clients that have established the connection to the server;
    a processor, configured to:
        search the memory for a second client according to the first address of the first client received by the receiver, wherein the second client belongs to a same local area network as the first client; and
        in response to finding the second client in the search, read a second address of the second client;
    a communications interface; and
    a transmitter, wherein the transmitter is configured to, in response to the processor reading the second address of the second client from the memory, return a first reply message to the first client, wherein the first reply message comprises the second address of the second client, and the first reply message instructs the first client to establish a connection to the second client.

7. The server according to claim 6, wherein the processor is further configured to:

in response to the second client not being found, store a second address of the first client in the memory, and establish a connection to the first client.

8. The server according to claim 6, wherein the communications interface is configured to transmit data to the first client using the second client.

9. The server according to claim 6, wherein the receiver is further configured to receive a third connection request sent by the first client;
wherein the processor is further configured to:
search the memory for a third client, wherein the third client belongs to the same local area network as the first client; and
in response to finding the third client, instruct the first client to establish a connection to the third client; and
wherein the communications interface is further configured to transmit data to the first client by using the third client.

10. The server according to claim 9, wherein the receiver is further configured to receive a fourth connection request sent by the first client;
wherein the processor is further configured to:
search the memory for a fourth client according to the fourth connection request received by the receiver, wherein the fourth client belongs to the same local area network as the first client; and
in response to the fourth client being found, instruct the first client to establish a connection to the fourth client; and
wherein the communications interface is further configured to transmit data to the first client by using the fourth client.

11. The server according to claim 6, wherein the processor is configured to find the second client by determining that the first address of the second client matches the first address of the first client.

12. The server according to claim 6, wherein the receiver is further configured to receive, from the first client, a message indicating that the connection between the first client and the second client is established.

13. A mobile terminal, comprising:
a transmitter, configured to send a first connection request to a server, wherein the first connection request comprises a first address of the mobile terminal, causing the server to search a storage device for a second client according to the first address of the mobile terminal, wherein the storage device is configured to store an identifier of each of a plurality of clients that have established a connection to the server and configured to store a first address and a second address of each of the plurality of clients that have established the connection to the server;
a receiver, configured to receive a first reply message sent by the server, wherein the first reply message comprises a second address of a second client that has been read by the server from the storage device, and the second client belongs to a same local area network as the mobile terminal;
a processor, configured to establish a connection to the second client according to the first reply message received by the receiver; and
a communications interface.

14. The mobile terminal according to claim 13, wherein the receiver is further configured to receive a second reply message sent by the server, wherein the second reply message does not comprise the second address of the second client; and
wherein the processor is further configured to establish a connection to the server according to the second reply message received by the receiver.

15. The mobile terminal according to claim 13, wherein the communications interface is configured to transmit data to the server using the second client.

16. The mobile terminal according to claim 13, wherein the transmitter is further configured to send a third connection request to the server;
wherein the receiver is further configured to receive a third reply message sent by the server, the third reply message comprises a second address of a third client, and the third client belongs to the same local area network as the mobile terminal;
wherein the processor is further configured to establish a connection to the third client according to the third reply message received by the receiver; and
wherein the communications interface is further configured to transmit data to the server using the third client.

17. The mobile terminal according to claim 13, wherein the transmitter is further configured to send a fourth connection request to the server;
wherein the receiver is further configured to receive a fourth reply message sent by the server, wherein the fourth reply message comprises a second address of a fourth client, and the fourth client belongs to the same local area network as the mobile terminal;
wherein the processor is further configured to establish a connection to the fourth client according to the fourth reply message received by the receiver; and
wherein the communications interface is further configured to transmit data to the server using the fourth client.

18. The mobile terminal according to claim 13, wherein the transmitter is further configured to send a message to the server indicating that the mobile terminal has established a connection to the second client.

* * * * *

UNITED STATES PATENT AND TRADEMARK OFFICE
CERTIFICATE OF CORRECTION

| | | |
|---|---|---|
| PATENT NO. | : 10,693,967 B2 | Page 1 of 1 |
| APPLICATION NO. | : 15/756916 | |
| DATED | : June 23, 2020 | |
| INVENTOR(S) | : Yongliang Wang | |

It is certified that error appears in the above-identified patent and that said Letters Patent is hereby corrected as shown below:

On the Title Page

Item (72) Inventor, Line 1, delete "Nanjiang" and insert --Nanjing--.

Signed and Sealed this
Eighth Day of September, 2020

Andrei Iancu
*Director of the United States Patent and Trademark Office*